United States Patent [19]
van Dam et al.

[11] Patent Number: 6,162,934
[45] Date of Patent: Dec. 19, 2000

[54] FRACTIONATION OF TRIGLYCERIDE FATS

[75] Inventors: Petrus Henricus van Dam, Wormerveer; Johan Jan Eshuis, Vlaardingen; Wim Hogervorst, Vlaardingen; Sylvia Noomen, Vlaardingen, all of Netherlands

[73] Assignee: Lipton, division of Conopco, Inc., Englewood, N.J.

[21] Appl. No.: 09/018,683

[22] Filed: Feb. 4, 1998

[30] Foreign Application Priority Data

Feb. 6, 1997 [EP] European Pat. Off. ............... 97200325

[51] Int. Cl.⁷ ........................................................ C11B 7/00
[52] U.S. Cl. ............................................. 554/212; 554/227
[58] Field of Search .................................... 554/212, 227

[56] References Cited

U.S. PATENT DOCUMENTS

| | | |
|---|---|---|
| 2,610,915 | 9/1952 | Mattil . |
| 3,059,008 | 10/1962 | Baur . |
| 3,059,009 | 10/1962 | Schmid . |
| 3,059,010 | 10/1962 | Schmid . |
| 3,059,011 | 10/1962 | Baur . |
| 3,158,490 | 11/1964 | Baur . |
| 3,536,461 | 10/1970 | Mueller . |
| 5,523,398 | 6/1996 | Glasser et al. . |

FOREIGN PATENT DOCUMENTS

| | | |
|---|---|---|
| 0157364 | 10/1985 | European Pat. Off. . |
| 0388572 | 9/1990 | European Pat. Off. . |
| 388572 | 9/1990 | European Pat. Off. . |
| 05/125389 | of 0000 | Japan . |
| 06/181686 | of 0000 | Japan . |
| 1015354 | 6/1962 | United Kingdom . |
| 2260333 | 4/1993 | United Kingdom . |
| 95/04122 | 2/1995 | WIPO . |
| 9504122 | 2/1995 | WIPO . |
| 95/26391 | 10/1995 | WIPO . |
| 9620266 | 7/1996 | WIPO . |

OTHER PUBLICATIONS

European Search Report Application No. EP 97/20,0325 dated Jul. 31, 1997.

The Lipid Handbook, 1986 Edition, pp. 213–215 by Gunstone, Harwood and Padley.

Fette, Seifen, Anstrichmittel 1978, 80, nr. 5 pp. 180–186.

International Search Report Application No. PCT/EP 98/00530 dated Jun. 24, 1998.

*Primary Examiner*—Deborah D. Carr

[57] ABSTRACT

Dry fractionation process where a fat soluble derivative of a high molecular weight polymer, preferably an ester of a polysaccharide is used as crystal habit modifier.

13 Claims, No Drawings

FRACTIONATION OF TRIGLYCERIDE FATS

The present invention is concerned with a process for fractionating triglyceride oils. The fractionation (fractional crystallisation) of triglyceride oils is described by Gunstone, Harwood and Padley in The Lipid Handbook, 1986 edition, pages 213–215. Generally triglyceride oils are mixtures of various triglycerides having different melting points. The composition of triglyceride oils may be modified e.g. by fractionation yielding a fraction having a different melting point or solubility.

One fractionation method is the so-called dry fractionation process which comprises cooling the oil until a solid phase crystallises and separating the crystallised phase from the liquid phase. The liquid phase is denoted as olein fraction, while the solid phase is denoted as stearin fraction.

The separation of the phases is usually carried out by filtration, optionally applying some kind of pressure.

The major problem encountered with phase separation in the dry fractionation process is the inclusion of a lot of liquid olein fraction in the separated stearin fraction. The olein fraction is thereby included in the inter- and intracrystal spaces of the crystal mass of the stearin fraction. Therefore the separation of the solid from the liquid fraction is only partial.

The solids content of the stearin fraction is denoted as the separation efficiency. In dry fractionation it seldom surpasses 0.5 to 0.6. This is detrimental to the quality of the stearin as well as to the yield of the olein.

For the related solvent fractionation process, where the fat to be fractionated is crystallised from e.g. a hexane or acetone solution, separation efficiencies may be up to 0.95.

Dry fractionation, however, is a process which is more economical and more environmentally friendly than solvent fractionation. For dry fractionation an increase of separation efficiency is therefore much desired.

The addition of a crystallisation modifying substance in a fractionation process of triglyceride oils has been described. The presence of small quantities of such a substance in the crystallising oil may accelerate, retard or inhibit crystallisation. In certain situations the above substances are more precisely indicated as crystal habit modifiers.

Known crystallisation modifiers are e.g. fatty acid esters of sucrose, described in U.S. Pat. No. 3,059,010, U.S. Pat. No. 3,059,010, JP 05/125389 and JP 06/181686, fatty acid esters of glucose and derivatives, described in U.S. Pat. No. 3,059,011. These crystallisation modifiers are effective in speeding up the crystallisation rate.

Other crystallisation modifiers, e.g. as described in U.S. Pat. No. 3,158,490, when added to kitchen oils have the effect that solid fat crystallisation is prevented or at least retarded. Other types of crystal habit modifiers are widely used as an ingredient for mineral fuel oils in which waxes are prone to crystallise at low temperatures. U.S. Pat. No. 3,536,461 teaches the addition of a crystal habit modifier to fuel oil with the effect that the cloud point temperature is lowered far enough to prevent crystal precipitation. Or, alternatively, the solids are induced to crystallise in a different habit so that the crystals when formed can pass fuel filters without clogging them.

Other crystal habit modifiers are actually able to change the habit of the crystallised triglyceride fat crystals in such a way that after crystallisation the crystals, the stearin phase, can be more effectively separated from the liquid phase, the olein phase. Publications describing such crystal habiters are e.g. GB 1 015 354, U.S. Pat. No. 2,610,915, WO 95/04123, WO 95/26391, U.S. Pat. No. 3,059,008, U.S. Pat. No. 3,059,009 and U.S. Pat. No. 3,059,010.

PCT application WO 95/04122 discloses fractionation of triglyceride oils whereby the crystallisation modifying substance is a comb type polymer of the group 1. or 2., where
1. is a copolymer having subunits A and B of which subunit A is derived from maleic acid or itaconic acid and subunit B is derived from vinyl alcohol, alkyl substituted vinyl alcohol, acrylic acid or styrene, A and B being present in a ratio of 10:1 to 1:10, where 5–100% of the maleic acid or itaconic acid subunits are connected to unbranched (C8–C24)-alkyl chains and where 0–100% of the vinyl alcohol or alkyl substituted vinyl alcohol or acrylic acid subunits are connected to unbranched (C1–C8)-alkyl chains and where
2. is inulin or phlein of which 5–100% of the hydroxyl groups on the fructose subunits are connected to (C8–C24) unbranched alkyl chains and 0–95% of the hydroxyl groups have been esterified with a (C1–C8)-alkyl containing fatty acid, preferably acetic acid.

The backbone of the above polymers of group 2 is formed by low molecular weight compounds. Inulines are polyfructoses having a total molecular weight of 4000–5500 Dalton. It is disclosed to use 0.5 wt % of inulin, fully esterified with palmitic acid in the dry fractionation of palm oil.

Esters of polysaccharides for enhancing crystallisation are mentioned in GB 904 048, GB 990 401, GB 995 444 and U.S. Pat. No. 3,059,008. The relevant polysaccharides are dextrins, which are hydrolysed starches and which consist of 2–15 saccharide units, each unit having a molecular weight of about 160 Dalton.

The separation efficiencies of known dry fractionation processes do not even approach the present figures for solvent fractionation being 0.9 and higher.

The presence of crystal habit modifiers is no longer desired as soon as the fat has crystallised. Since these crystallisation aids are not allowed or desired as food ingredients, they should not remain in the fat. Normally however, it is far from easy to have them separated from the triglyceride fat.

STATEMENT OF INVENTION

It has been found that fat soluble derivatives of high molecular weight polymers, particularly polysaccharide esters and polypeptide esters, are highly effective in enhancing triglyceride oil crystallisation and subsequent stearin separation. Generally the polymer derivatives for use in the present invention have a backbone of 10–500,000 kDa.

Accordingly the invention relates to a process for separating solid fatty material from a partially crystallised triglyceride oil, which comprises the steps:

a. heating said oil until no longer a substantial amount of solid triglyceride is present in said oil, or dissolving said oil into an inert solvent until the solution no longer contains a substantial amount of solid triglyceride, b. cooling and crystallising said oil resulting in a solid stearin phase and a liquid olein phase and c. recovering said stearin phase by separating it from said olein phase, wherein said oil or a solution of said oil in an inert solvent comprises a crystallisation modifying substance, characterised in that the crystallisation modifying substance is a polymer with reactive sites, which has been made fat soluble by derivatizing the reactive sites to an average degree of 50–100% with an acid or acid derivative, or with an alcohol or an alcohol derivative and which polymer has a molecular weight before derivatizing of 10–500,000 kDa, whereby the polymer is not a copolymer having subunits A and B of which subunit A is derived from maleic acid or itaconic acid and subunit B is derived from vinyl alcohol, alkyl substituted vinyl alcohol, acrylic acid or styrene, A and B being present in a ratio of 10:1 to 1:10, where 5–100% of the maleic acid or itaconic acid subunits are connected to unbranched (C8–C24)-alkyl chains and where 0–100% of the vinyl alcohol or alkyl substituted vinyl alcohol or acrylic acid subunits are connected to unbranched (C1–C8)-alkyl chains.

A possible additional benefit of the use of these high molecular weight derivatized polymers is that they can be removed from the product by membrane filtration.

DETAILS OF THE INVENTION

The oil to be fractionated is mixed with the crystallisation modifying substance (the additive) before crystallisation starts, preferably before the oil is heated or dissolved in the solvent so that all solid triglyceride fat and preferably also the modifying substance is liquefied.

Then the oil or solution is cooled to the chosen crystallisation temperature. For e.g. palm oil suitable temperatures are 15–35° C. To each temperature belongs a specific composition of the olein and stearin phases. Crystallisation proceeds at the chosen temperature until an equilibrium solid phase content. Common crystallisation times are 4–16 hours. During crystallisation the oil may remain quiescent or is stirred, e.g. with a gate stirrer. The improvement in separation efficiency often depends on the mode of crystallisation, either stagnant or stirred. Often high efficiencies are obtained with stagnant crystallisation. From the point of view of process economy, however, stirred crystallisation is preferred.

We have found that the process according to the invention as disclosed above often provides high separation efficiencies, also for stirred fractionation.

The stearin and olein phases may be separated for example by filtration. For an effective separation a membrane filter press can be used, which allows relatively high pressures. Suitable pressures are 3–50 bar, exerted for about 20–200 minutes. However, already with a low or moderate pressure the stearin phase obtained according to the present invention is easily and with a high efficiency separated from the olein phase. For a proper separation preferably the separation time is about 10–60 minutes, more preferably 30–60 minutes.

The solids content of the crystallised slurry before separation and of the stearin phase obtained after separation can be measured according to the known pulse NMR method (ref. Fette, Seifen, Anstrichmittel 1978, 80, nr. 5, pp. 180–186).

The effect of the invention is believed to be caused by alteration of the crystal structure or crystal habit of the stearin under the influence of the additives i.e. the polymers. These additives, the crystal habit modifiers, might interfere with the growth of each of the various crystal faces in different ways. At microscopic inspection the crystals and crystal aggregates formed in the oil with the polymers are conspicuously different from the crystals obtained without those crystallisation modifying substances. These crystals and aggregates can be filtered more effectively in that the stearin fraction retains less of the olein fraction even at low or moderate filtration pressure. A considerable increase of the separation efficiency results.

Copolymers having subunits A and B of which subunit A is derived from maleic acid or itaconic acid and subunit B is derived from vinyl alcohol, alkyl substituted vinyl alcohol, acrylic acid or styrene, A and B being present in a ratio of 10:1 to 1:10, where 5–100% of the maleic acid or itaconic acid subunits are connected to unbranched (C8–C24)-alkyl chains and where 0–100% of the vinyl alcohol or alkyl substituted vinyl alcohol or acrylic acid subunits are connected to unbranched (C1–C8)-alkyl chains, are not included in the process according to the invention. Said polymers are disclosed in WO 95/04122. This document discloses the use of said copolymers in the dry fractionation of palm oil. Said copolymers only provide an increase in separation efficiency of 20% under stirred conditions.

We have found that an increase in separation efficiency of 0.4 can be easily attained under stirred conditions, when the polymers according to the invention are used.

The polymer which forms the backbone of the habit modifier preferably is a polysaccharide, but alternative polymers may be used such as polypeptides with reactive sites. Preferably the polymer is derivatized with acids or acid derivatives or with alcohols or alcohol derivatives which helps to make the polymer fat soluble.

Preferably acids or acids derivatives are used resulting in esterified polymers.

More preferably the reactive sites of the polymer have been derivatized with a single fatty acid or a mixture of fatty acids or fatty acids derivatives chosen from the range of C8–C22 fatty acids.

Therefore a preferred embodiment of the present process for obtaining a stearin with an increased solids level uses a crystallisation modifying substance which is an esterified polysaccharide. Polysaccharides are constituted from monomers which are sugar or saccharide moieties. In monomers which are sugar or saccharide moieties. In dextrines, cellulose or starch the most common monomer or saccharide unit is glucose. But other polysaccharides show other saccharide monomers, for example maltose, fructose, mannose, galactopyranosyl or xylose. Essential is that the polymer can be derivatized using the reactive groups, which are in the case of polysaccharides preferably hydroxyl groups.

Not only polymers, especially polysaccharides which show linear polymerisation, but also polymers, especially polysaccharides, with branched chains such as amylopectin with a Mw of 10–500,000 kDa are comprised by the invention.

Preferably the polymer has an elongated shape which means that the polymer backbone is not branched.

The crystallisation modifiers covered by the present invention are prepared from derivatizable polymers having before being derivatized a molecular weight of 10–500,000 kDa, preferably 20–100,000 kDa, more preferably 50–100,000 kDa.

In general polysaccharides contain three free hydroxyl groups per sugar monomer on average and therefore they have a hydrophilic nature. Free hydroxyl groups are those hydroxyl groups of the sugar moiety that are not bound to another sugar moiety or any other moiety.

The polysaccharides of the present invention have been derivatized fully or partially and at least to a degree such that the polymers have become fat-soluble. Preferably, the esterification degree is on average 50–100%, which means that on average 1.5–3 hydroxyl groups per sugar monomer have been esterified.

The polysaccharide esters of the present invention are preferably constituted with acid residues derived from fatty acids.

Such fatty acids may be a single fatty acid, such as palmitic acid or stearic acid, but preferably these are a mixture of fatty acids.

The derivatives can be obtained by standard syntheses. For the preparation of esters a multitude of common synthetic methods is available. According to a preferred embodiment the synthesis employs enzymes.

The fatty acids are chosen preferably from the group of C8–C22 fatty acids which occur in natural fats, particularly C12, C14, C16, C18 and C18:1 fatty acids and which may be used as a single fatty acid or, more common, as a mixture.

When palm oil is fractionated, preferred fatty acids are C10, C12, C14, C16, C18 and C18:1 fatty acids.

Although the invention is applicable both in solvent fractionation and in detergent fractionation, the process preferably is carried out as a dry fractionation process.

The process is preferably applied to relatively high melting fats, such as palm kernel oil, shea oil, coconut oil, cottonseed oil, arachid oil, butter oil and hardened rapeseed oil, hardened soybean oil or fractions of these oils and particularly on palm oil. The palm oil might be crude, but preferably is of refined quality.

The crystallisation modifying substance is preferably admixed in an amount of 0.005–5 wt. %, preferably 0.01–2 wt. % on the total amount of oil.

By use of the process according to the invention an increase of separation efficiencies to 0.7 and more may be easily attained, which for dry fractionation is very high.

The size of the new crystallisation modifiers provides a further advantage:

Many effective crystallisation modifying substances known from the prior have not yet been approved as food ingredient. It is a processing aid which before use of the fat in food must be removed. This has appeared to be an expensive treatment, if at all possible.

A major advantage of the present crystallisation modifying substances is that the molecules are big enough to be separated from the oil by known physical means, particularly by employing membrane separation. The removal of crystal habit modifiers from the olein fraction by filtration is shown in table I. Habit modifiers according to the prior art can not be retained by the relative large pore membranes of the type which are suitable for triglyceride oil filtration.

According to a preferred embodiment the process described above is supplemented after separation by a step comprising fully liquefying by heating (if needed) one or both of the collected fractions and passing these through a membrane. The membrane pore size can be chosen such that the habit modifier is retained.

In this way the present invention provides the option to recycle the separated habit modifier which often is an expensive processing aid.

TABLE I removal of crystal habit modifier by filtration
Polysaccharides content and membrane filtration

|  | before | after |
|---|---|---|
| Palm oil stearin | 400 ppm | <10 ppm |

Polymers preferably are chosen from the group consisting of cellulose (poly-glucose), pullulan (poly-maltotriose), amylose (poly-glucose), starch (poly-glucose), locust bean gum and guar gum.

The invention is illustrated by the following examples:

GENERAL

The crystallisation modifying substances can be prepared by standard methods starting from the backbone substance and derivatizing it with the side chain substance, as exemplified for the preparation of fully esterified dipalmitoyl-lauroyl cellulose:

A mixture of lauric acid (C12) and palmitic acid (C16) is heated at 50° C. Trifluoroacetic acid anhydride is added and after the free fatty acids have melted the mixture is stirred for half an hour. Then cellulose (Avicel PH-101™) is added. The suspension is allowed to react for 5 hours. The mixture becomes clear and very viscous.

Then the mixture is poured into warm acetone while stirring vigorously. The precipitate is filtered off, dried and analysed. If the cellulose still contains FFA it is dissolved in ether and precipitated in acetone again. With infrared spectroscopy can be established that the cellulose is fully esterified.

EXAMPLE 1

A crystallizer is filled with 1.2 kg of refined palm oil. The oil is heated until fully liquefied. Then a crystallisation modifying substance is added according to Table II. While stirring at 50 rpm the oil is cooled from 65° C. to 23° C. in 60 minutes. During the crystallisation the solid phase content (SPC) of the crystal slurry is measured regularly. The steady state is reached at about 12–13% SPC and then the crystal slurry is transferred to a filter press. After filtration the pressure is built up to to 12 bar with a rate of 2 bar/min. The total pressing time is 30 minutes. The load of the membrane filter press is ca. 35 kg/m$^2$ and the typical thickness of the stearin layer is ca. 12 mm. The stearin yield is measured and the SPC of the stearin cake is then measured by NMR.

The SE (SPC of the stearin cake) obtained in the control experiment, without addition of polysaccharides is about 0.50.

TABLE II

| Ex. | Habit modifier backbone | Acid residues | MW (kDa) | Conc % | SE w/w | dSE % |
|---|---|---|---|---|---|---|
| 1 | cellulose | 2C16/C12 | 30 | 0.04 | 0.74 | 48 |
| 2 | pullulan | 2C16/C12 | 100 | 0.02 | 0.70 | 40 |
| 3 | amylo-pectine | 2C16/C12 | 84 | 0.3 | 0.86 | 54 |
| 4 | locust bean gum | 2C16/C12 | 17 | 0.02 | 0.71 | 46 |
| Comparison examples | | | | | | |
| A | inulin | C16/C12 | 4.9 | 0.1 | 0.59 | 18 |
| B | inulin | C16/C12 | 3.6 | 0.1 | 0.56 | 11 |
| C | none | — | — | 0 | 0.50 | 0 |

Mw is molecular weight of backbone, without the fatty acids residues
dSE is the SE-improvement relative to the control experiment C.
Cellulose is beta-D-1,4-glucan
Dextran is alpha-D-(1,6)-glucan
Pullulan is repeating units of maltotriose joined by alpha D-(1,6)-linkages
Inulin is beta-D-(1,2)-fructan
Amylopectin is chains of alpha-D-(1->4)-glucans of various lengths joined via unequally spaced alpha-D-(1->6)-linkages.

What is claimed is:

1. Process for separating solid fatty material from a partially crystallised triglyceride oil, which comprises the steps:
   a. heating said oil until no longer a substantial amount of solid triglyceride is present in said oil, or dissolving said oil into an inert solvent until the solution no longer contains a substantial amount of solid triglyceride,
   b. cooling and crystallising said oil resulting in a solid stearin phase and a liquid olein phase and c. recovering said stearin phase by separating it from said olein phase, wherein said oil or a solution of said oil in an inert solvent comprises a crystallisation modifying substance, characterised in that the crystallisation modifying substance is a polymer with reactive sites, which has been made fat soluble by derivatizing the reactive sites to an average degree of 50–100% with an acid or acid derivative, or with an alcohol or an alcohol derivative and which polymer has a molecular weight before derivatizing of 10–500,000 kDa, whereby the polymer is not a copolymer having subunits A and B of which subunit A is derived from maleic acid or itaconic acid and subunit B is derived from vinyl alcohol, alkyl substituted vinyl alcohol, acrylic acid or styrene, A and B being present in a ratio of 10:1 to 1:10, where 5–100% of the maleic acid or itaconic acid subunits are connected to unbranched (C8–C24)-alkyl chains and where 0–100% of the vinyl alcohol or alkyl substituted vinyl alcohol or acrylic acid subunits are connected to unbranched (C1–C8)-alkyl chains.

2. Process according to claim 1, characterised in that the reactive sites of the polymer have been derivatized with a single fatty acid or a mixture of fatty acids or fatty acids derivatives chosen from the range of C8–C22 fatty acids.

3. Process according to claim 1, characterised in that the polymer is chosen from the group of polysaccharides and polypeptides.

4. Process according to claim 1, characterised in that the polymer is a polysaccharide.

5. Process according to claim 1, characterised in that the polymer is a polypeptide.

6. Process according to claim 1, characterised in that the polymer has a molecular weight (before derivatizing) of 20–100,000 kDa.

7. Process according to claim 1, characterised in that the polymer has an elongated shape.

8. Process according to claim 1, characterised in that a separation efficiency of at least 0.7 is attained.

9. Process according to claim 4, characterised in that the polysaccharide backbone is cellulose or amylopectin.

10. Process according to claim 1 which is followed by membrane filtration of one or both of the liquefied fractions.

11. Triglyceride oil which comprises a polysaccharide which has been made fat soluble by derivatizing the reactive sites to an average degree of 50–100% with an acid or acid derivative, or with an alcohol or an alcohol derivative, which polysaccharide has a molecular weight before derivatizing of 10–500,000 kDa.

12. Triglyceride oil according to claim 11 which contains 0.0001–10 wt. % of said polysaccharide.

13. Triglyceride oil according to claim 11 characterised in that the polysaccharide is esterified with a fatty acid or a mixture of fatty acids.

* * * * *